(12) United States Patent
Elliot et al.

(10) Patent No.: US 11,673,198 B2
(45) Date of Patent: Jun. 13, 2023

(54) SYSTEM AND METHOD FOR REDUCING DROP PLACEMENT ERRORS AT PERIMETER FEATURES ON AN OBJECT IN A THREE-DIMENSIONAL (3D) OBJECT PRINTER

(71) Applicant: Xerox Corporation, Norwalk, CT (US)

(72) Inventors: Jack G. Elliot, Penfield, NY (US); Rachel L. Tanchak, Rochester, NY (US); Derek A. Bryl, Churchville, NY (US); Piotr Sokolowski, Webster, NY (US); Erwin Ruiz, Rochester, NY (US); David A. Mantell, Rochester, NY (US); Brendan McNamara, W. Henrietta, NY (US); Peter M. Gulvin, Webster, NY (US); Christopher T. Chungbin, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 296 days.

(21) Appl. No.: 17/163,368

(22) Filed: Jan. 30, 2021

(65) Prior Publication Data

US 2022/0241866 A1   Aug. 4, 2022

(51) Int. Cl.
*B22F 10/85* (2021.01)
*B33Y 10/00* (2015.01)
*B22F 10/22* (2021.01)
*B33Y 50/02* (2015.01)
*B33Y 30/00* (2015.01)
*B22F 12/53* (2021.01)

(52) U.S. Cl.
CPC .............. *B22F 10/85* (2021.01); *B22F 10/22* (2021.01); *B22F 12/53* (2021.01); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

2003/0125828 A1   7/2003   Corey
2020/0139615 A1   5/2020   Susnjara et al.

*Primary Examiner* — Anthony M Liang
(74) *Attorney, Agent, or Firm* — Maginot Moore & Beck LLP

(57) ABSTRACT

A slicer in a material drop ejecting three-dimensional (3D) object printer generates machine ready instructions that operate components of a printer, such as actuators and an ejector having at least one nozzle, to form features of an object more precisely than previously known. The instructions generated by the slicer use positional data from an encoder to control the actuators to move the ejector and a platform on which the object is formed relative to one another to form edges of the feature.

13 Claims, 4 Drawing Sheets

SYSTEM AND METHOD FOR REDUCING DROP PLACEMENT ERRORS AT PERIMETER FEATURES ON AN OBJECT IN A THREE-DIMENSIONAL (3D) OBJECT PRINTER

CROSS-REFERENCED APPLICATION

This application cross-references U.S. patent application Ser. No. 17/163,363, which is entitled "System And Method For Reducing Drop Placement Errors At Perimeter Features On An Object In A Three-Dimensional (3D) Object Printer," which was filed on Jan. 30, 2021, the entirety of which is hereby expressly incorporated by reference.

TECHNICAL FIELD

This disclosure is directed to three-dimensional (3D) object printers that eject drops of material to form three-dimensional (3D) objects and, more particularly, to the formation of object features that require velocity changes in the relative motion of the components of the object printer.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use ejectors that eject drops of melted materials, such as photopolymers or elastomers. The printer typically operates one or more ejectors to form successive layers of the thermoplastic material that form a three-dimensional printed object with a variety of shapes and structures. After each layer of the three-dimensional printed object is formed, the plastic material is cured so it hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

Recently, some 3D object printers have been developed that eject drops of melted metal from one or more ejectors to form 3D objects. These printers have a source of solid metal, such as a roll of wire or pellets, that is fed into a heating chamber where the solid metal is melted and the melted metal flows into a chamber of the ejector. An uninsulated electrically conducting wire is wrapped around the chamber. An electrical current is passed through the conductor to produce an electromagnetic field that causes the meniscus of the melted metal at a nozzle of the chamber to separate from the melted metal within the chamber and be propelled from the nozzle. A platform opposite the nozzle of the ejector is moved in a X-Y plane parallel to the plane of the platform by a controller operating actuators so the ejected metal drops form metal layers of an object on the platform and another actuator is operated by the controller to alter the position of the ejector or platform in the vertical or Z direction to maintain a constant distance between the ejector and an uppermost layer of the metal object being formed. This type of metal drop ejecting printer is also known as a magnetohydrodynamic printer.

In these known 3D object printers that eject material drops to form objects, the printhead and the platform on which the object is formed move relative to one another in an X-Y plane and in a Z plane that is perpendicular to the X-Y plane. A program typically called a slicer processes a three-dimensional model or other digital data model of the object to be produced to generate data identifying each layer of the object and then generate machine-ready instructions for execution by the printer controller in a known manner. Execution of these instructions causes the controller to operate the components of the printer to move the platform and the printhead relative to one another while operating the printhead to eject drops of material that form the object corresponding to the digital data model. The generation of the machine-ready instructions can include the production of intermediate models, such as when a CAD digital data model for an object is converted into a STL object layer data model, or other polygonal mesh or other intermediate representation, which can in turn be processed to generate machine instructions, such as g-code, for fabrication of the device by the printer.

The machine instructions, when executed by the printer controller, generate signals for the actuators that move the printhead and the platform supporting the object relative to one another and the signals that operate the one or more ejectors in the printhead. Some features within a layer or on the perimeter of a layer require the relative movement between the ejector and the platform to decelerate as the end of the feature is approached and then that movement is accelerated for completion of the contour of the feature. The instructions, when executed by the controller for the printer, stop or almost stop the relative movement of the ejector and platform at one edge of the feature and then the instructions, when executed, cause the relative movement to be along a path that is coincident with the other edge of the feature. This acceleration and deceleration in the relative movement of the ejector and platform can produce errors in the placement of the drops forming the feature. These errors can cause irregularities in the feature, especially when the change in relative motion velocity occurs at an edge of the feature. To attenuate the production of these irregularities, the relative movement occurs along a path that joins the first edge of the feature to the second edge of the feature. Thus, the feature is slightly rounded. Not only is the feature rounded rather than precise but the time required for forming the corner is increased by the deceleration and acceleration of the ejector. Being able to place material drops more precisely for the formation of object features in additive manufacturing machines would be beneficial.

SUMMARY

A new method of operating a material drop ejecting 3D object printer can place material drops more precisely for the formation of object features than known 3D object printers. The method includes identifying a feature to be formed in an object layer of an object to be formed on a platform using an object data model of the object to be formed, operating an ejector to eject drops of a material while the ejector and a platform on which the object is being formed move relative to one another to form a first edge of the feature, moving the ejector and the platform relative to one another so the ejector moves away from an end of the first edge, moving the ejector and the platform relative to one another to return the ejector to the end of the first edge, and operating the ejector to eject drops of the material while moving the ejector and the platform relative to one another to form a second edge of the feature, the first edge and the second edge forming at least a portion of a perimeter of the feature.

A new material drop ejecting 3D object printer more precisely places material drops to form features that require ejector directional changes than previously known 3D object printers. The material drop ejecting 3D object printer includes an ejector having at least one nozzle that is configured to eject drops of a material, a platform positioned opposite the ejector head, at least one actuator operatively connected to at least one of the platform and the at least one ejector, the at least one actuator being configured to move the at least one of the platform and the at least one ejector relative to one another, and a controller operatively connected to the ejector head and the at least one actuator. The controller is configured to identify a feature to be formed in an object layer of an object to be formed on a platform using an object data model of the object to be formed, operate the ejector to eject drops of a material while operating the at least one actuator to move the ejector and the platform on which the object is being formed move relative to one another to form a first edge of the feature, operate the at least one actuator to move the ejector and the platform relative to one another so the ejector moves away from an end of the first edge, operate the at least one actuator to move the ejector and the platform relative to one another to return the ejector to the end of the first edge, and operate the ejector to eject drops of the material while operating the at least one actuator to move the ejector and the platform relative to one another to form a second edge of the feature, the first edge and the second edge forming at least a portion of a perimeter of the feature.

BRIEF DESCRIPTION OF THE DRAWINGS

The foregoing aspects and other features of a method of operating a material drop ejecting 3D object printer and a new material drop ejecting 3D object printer that more precisely places material drops for forming features requiring velocity changes in the relative motion of the ejector and the platform on which an object is formed than previously known 3D object printers are explained in the following description, taken in connection with the accompanying drawings. The method and printer described below use a slicer that generates instructions for relatively moving the ejector and the platform at a constant velocity during formation of a feature or by ejecting a last drop of a first edge of the feature at a predetermined location and then moving the ejector outside of the feature before the relative movement of the ejector and the platform returns the ejector to the predetermined position for ejecting the first drop of a second edge of the feature. The intersection of the first and second edges forms a perimeter of the feature more precisely. Additionally, the time to form the sharp corner is decreased over previously known printers since the constant velocity of the relative movement between the ejector and the platform does not change during feature formation.

DETAILED DESCRIPTION

Figure 1:
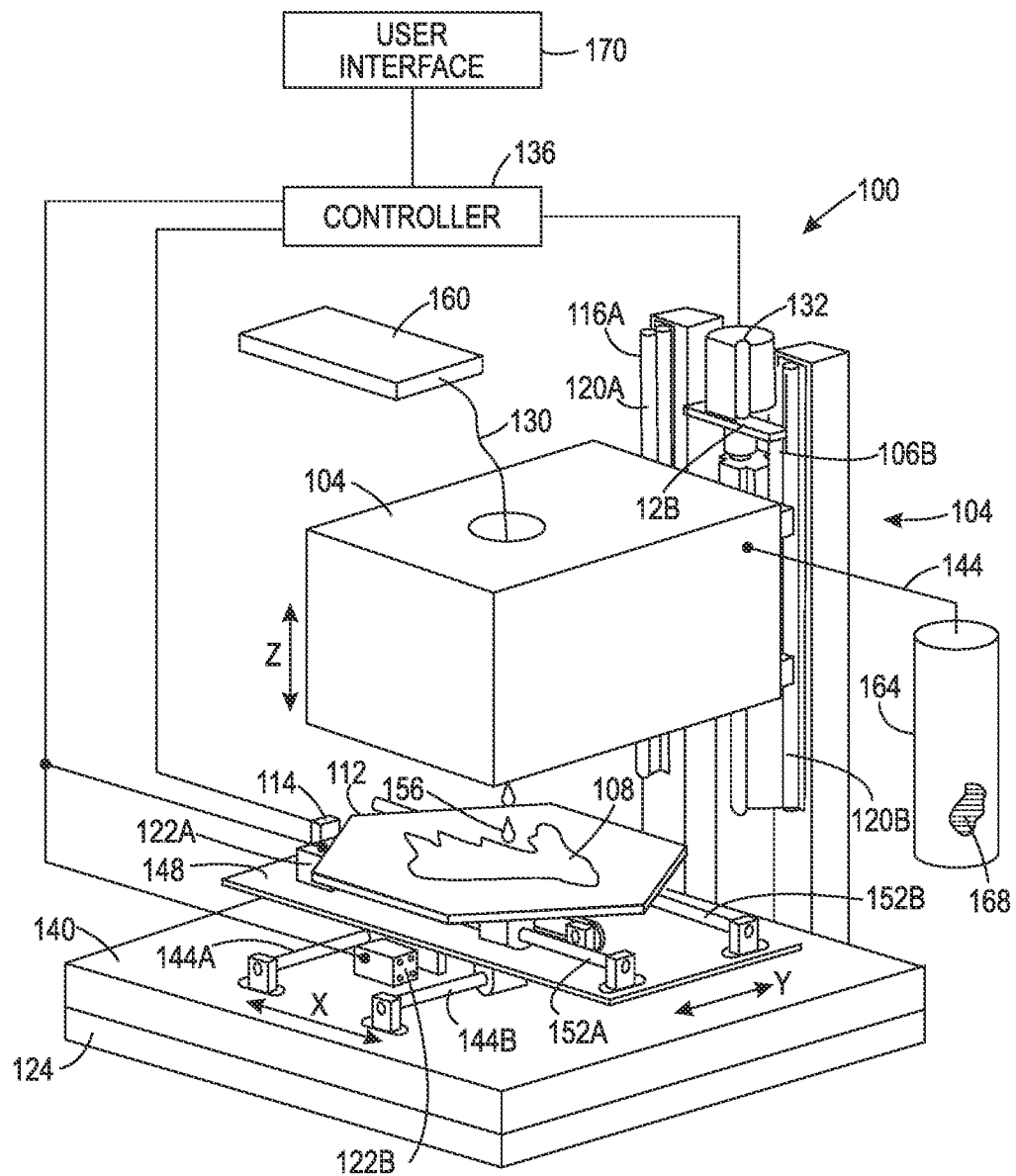
FIG. 1 depicts a metal drop ejecting 3D metal object printer that more precisely places material drops to form features than previously known 3D object printers that required velocity changes in the relative movement of an ejector and a platform to form the features.

For a general understanding of a 3D object printer and its operation that form features more precisely than previously known 3D object printers that require velocity changes to form the features, reference is made to the drawings. In the drawings, like reference numerals designate like elements.

FIG. 1 illustrates an embodiment of a melted metal 3D object printer 100 that is configured with a slicer that generates machine ready instructions for moving the platform and ejector relative to one another to form features more precisely than previously known 3D object printers. As used in this document, the term "feature" means a structure within an object layer that required previously known 3D object printers to change the velocity of the relative movement between the ejector and the platform to form the structure. Although the printer 100 is depicted with a single nozzle, it could be configured with multiple nozzles or multiple ejector heads. Also, while the description below is made with reference to the metal drop ejecting 3D object printer 100 of FIG. 1, the controller 136 configured with the slicer program can be used with a single nozzle or multi-nozzle 3D object printer that ejects drops of other materials, such as thermoplastic material.

In the printer of FIG. 1, drops of melted bulk metal are ejected from an ejector having a single nozzle in an ejector head 104 and drops from the nozzle form lines for layers of an object 108 on a platform 112. As used in this document, the term "bulk metal" means conductive metal available in aggregate form, such as wire of a commonly available gauge or pellets of macro-sized proportions. A source of bulk metal 160, such as metal wire 130, is fed into the ejector head and melted to provide melted metal for a chamber within the ejector head. An inert gas supply 164 provides a pressure regulated source of an inert gas 168, such as argon, to the chamber of melted metal in the ejector head 104 through a gas supply tube 144 to prevent the formation of metal oxide within the ejector head or along the flight of the melted metal drops toward the object being formed.

The ejector head 104 is movably mounted within Z-axis tracks 116A and 116B in a pair of vertically oriented members 120A and 120B, respectively. Members 120A and 120B are connected at one end to one side of a frame 124 and at another end to one another by a horizontal member 128. An actuator 132 is mounted to the horizontal member 128 and operatively connected to the ejector head 104 to move the ejector head along the Z-axis tracks 116A and 166B. The actuator 132 is operated by a controller 136 to maintain a distance between the single nozzle of the ejector in the ejector head 104 and an uppermost surface of the object 108 on the platform 112.

Mounted to the frame 124 is a planar member 140, which can be formed of granite or other sturdy material to provide reliably solid support for movement of the platform 112. Platform 112 is affixed to X-axis tracks 144A and 144B so the platform 112 can move bidirectionally along an X-axis as shown in the figure. The X-axis tracks 144A and 144B are affixed to a stage 148 and stage 148 is affixed to Y-axis tracks 152A and 152B so the stage 148 can move bidirectionally along a Y-axis as shown in the figure. Actuator 122A is operatively connected to the platform 112 and actuator 122B is operatively connected to the stage 148. Controller 136 operates the actuators 122A and 122B to move the platform along the X-axis and to move the stage 148 along the Y-axis to move the platform in an X-Y plane that is opposite the ejector head 104. Performing this X-Y planar movement of platform 112 as drops of molten metal 156 are ejected toward the platform 112 forms a line of melted metal drops on the object 108. Controller 136 also operates actuator 132 to adjust the vertical distance between the ejector head 104 and the most recently formed layer on the substrate to facilitate formation of other structures on the object. While the molten metal 3D object printer 100 is depicted in FIG. 1 as being operated in a vertical orientation, other alternative orientations can be employed. Also, while the embodiment shown in FIG. 1 has a platform that moves in an X-Y plane and the ejector head moves along the Z axis, other arrangements are possible to achieve relative movement between the ejector in the ejector head and the platform on which an object is formed. For example, either the ejector head 104, the platform 112, or both can be configured to achieve relative movement between the ejector head 104 and the platform 112 in the X-Y plane and along the Z axis. An encoder 114 is operatively connected to the controller 136. The encoder 114 is configured to generate positional data indicative of the position of the ejector in the ejector head in relation to the platform as a result of the relative movement between the ejector head and the platform. This positional data is used by the controller to control the relative movement of the ejector head and the platform and to control the ejections of the ejector as described more fully below.

The controller 136 can be implemented with one or more general or specialized programmable processors that execute programmed instructions. The instructions and data required to perform the programmed functions can be stored in memory associated with the processors or controllers. The processors, their memories, and interface circuitry configure the controllers to perform the operations previously described as well as those described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits. During metal object formation, image data for a structure to be produced are sent to the processor or processors for controller 136 from either a scanning system or an online or work station connection for processing and generation of the ejector head control signals output to the ejector head 104.

The controller 136 of the melted metal 3D object printer 100 requires data from external sources to control the printer for metal object manufacture. In general, a three-dimensional model or other digital data model of the object to be formed is stored in a memory operatively connected to the controller 136, or the controller can access through a server or the like a remote database in which the digital data model is stored, or a computer-readable medium in which the digital data model is stored can be selectively coupled to the controller 136 for access. This three-dimensional model or other digital data model is processed by a slicer program implemented with the controller to produce data identifying each layer of an object and then generate machine-ready instructions for execution by the controller 136 in a known manner to operate the components of the printer 100 and form the metal object corresponding to the model. The generation of the machine-ready instructions can include the production of intermediate models, such as when a CAD digital data model for an object is converted into a STL object layer data model, or other polygonal mesh or other intermediate representation, which can in turn be processed to generate machine instructions, such as g-code, for fabrication of the device by the printer. As used in this document, the term "machine-ready instructions" means computer language commands that are executed by a computer, microprocessor, or controller to operate components of a 3D metal object additive manufacturing system to move the ejector head and the platform relative to one another and to operate the ejector in the ejector head to form objects on the platform 112 with the material drops ejected by the printer. The controller 136 executes the machine-ready instructions to control the ejection of the material drops from the ejector head 104, the positioning of stage 148 and the platform 112, as well as the distance between the ejector head 102 and the uppermost layer of the object 108 on the platform 112.

Figure 2:
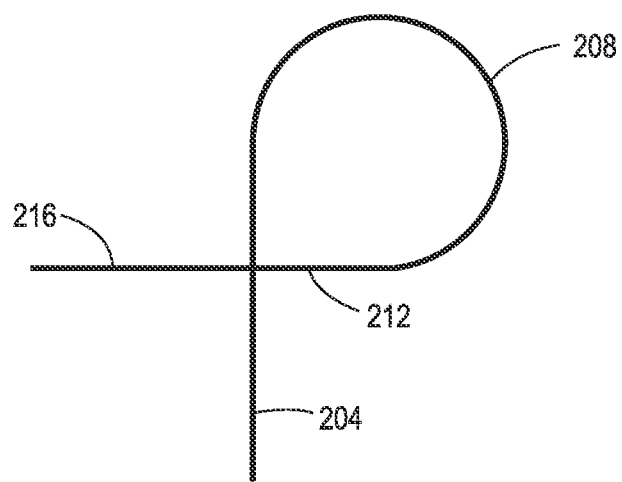
FIG. 2 is an illustration of a tool path for relative movement of the ejector and the platform to form a feature with the printer of FIG. 1.

In the printer of FIG. 1, the controller 136 is configured with a slicer program that generates machine ready instructions for forming features more precisely than previously known. As used in this document, the term "edge of a feature" means a segment forming a portion of a perimeter of a feature. As shown in FIG. 2, these generated instructions cause the controller 136 to move the ejector and the platform relative to one another at a constant velocity along a path that forms a first edge 204 of a feature and along a return path 208 to the end of the first edge to form a second edge 216 of the feature in a layer of the object. By precisely placing the last drop of edge 204 at a predetermined location of the feature and then precisely placing the first drop of the edge 216 closely to the last drop of the edge 204 at the predetermined location the feature is formed more precisely. In one embodiment, the first drop of the second edge is positioned at about one-half of a diameter of an ejected drop from the last drop of the first edge so the perimeter of the feature is continuously formed. To perform this placement, the additionally generated machine ready instructions maintain the relative movement of the ejector and the platform at a constant velocity along the entire path defined by first edge 204, the return path 208, 212, and the second edge 216. Alternatively, the generated machine ready instructions identify a first encoder value that identifies the position of the last drop of the first edge and a second encoder value that identifies the position of the first drop of the second edge. While the return path is shown as being circular in FIG. 2, other path shapes, such as rectilinear, triangular, and polygonal can be used depending on the topography in the vicinity of the edges of the feature. Other instructions cause the controller to regulate the ejection frequency of the ejector so the first and second edges are continuously formed. The generation of these additional machine ready instructions that cause the controller to operate the components of the printer to perform operations other than those defined by the digital data model for the object enable the printer to form features more precisely than previously known machines. While the example shown in FIG. 2 depicts a feature in an external perimeter for a layer, the feature can be within the interior of a perimeter as well. Also, while the feature formed by lines 204 and 216 is a right angled feature, features can be formed with other angles, such as acute or obtuse angles.

Figure 3:
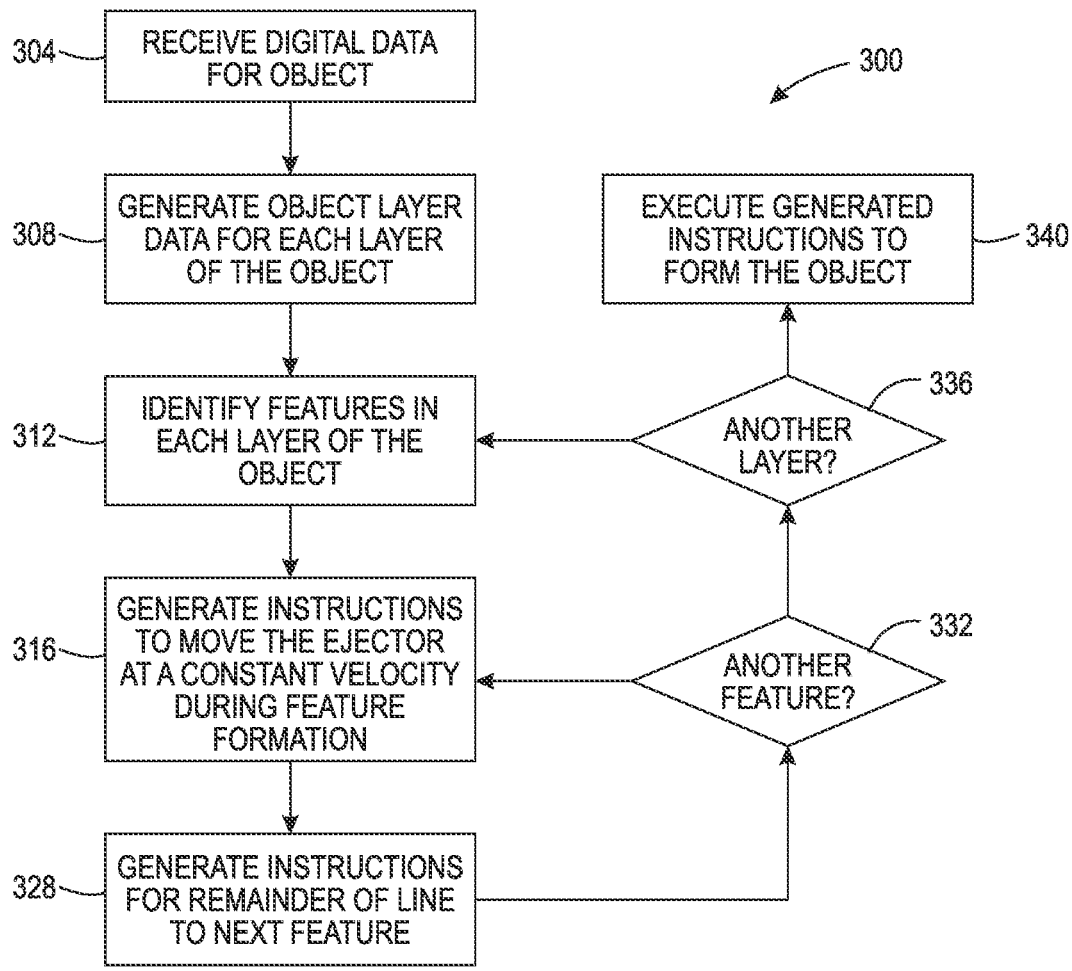
FIG. 3 is a flow diagram of a process implemented by a slicer program in the printer of FIG. 1 that forms features more precisely than previously known 3D object printers by moving the ejector and the platform relative to one another at a constant velocity during feature formation.

A process for operating a material drop ejecting 3D object printer to form features more precisely than previously known printers is shown in FIG. 3. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 136 noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

FIG. 3 is a flow diagram of a process 300 that operates a material drop ejecting 3D object printer, such as printer 100, to form features more precisely than previously known printers. The process 300 begins with the slicer receiving the digital data model for the object to be produced (block 304). The slicer then generates object layer data for forming the layers of the object (block 308). The slicer then identifies features in object layer data for each layer of the object (block 312). Rather than generating machine ready instructions that decelerate the relative movement of the ejector head and the platform as the ejector approaches a turn in the perimeter of a feature as previously done, the slicer generates machine ready instructions that move the ejector head and the platform relative to one another at a constant velocity along the first edge of the feature, along a return path to the end of the first edge of the feature, and along a second edge of the feature (block 316). Instructions are generated to move the ejector head to a position opposite the end of the first edge of the feature (block 320) with other instructions that adjust the velocity of the ejector head and the platform relative to one another along the second edge of the feature and the frequency of drop ejection to form the second edge at a relatively uniform density. When these instructions are executed, operation of the ejector in the ejector head commences at a position about one-half of a drop diameter past the end of the first edge of the feature (block 324). Instructions for forming the remaining portion of the perimeter are generated in a known manner until another feature is identified so the process can be repeated (block 328). This process is repeated for each feature in a layer (block 332) and for each layer in the object (block 336). When all of object layer data has been processed, the machine ready instructions are executed by the controller to operate the printer and form the object on the platform 112 (block 340).

Figure 4:
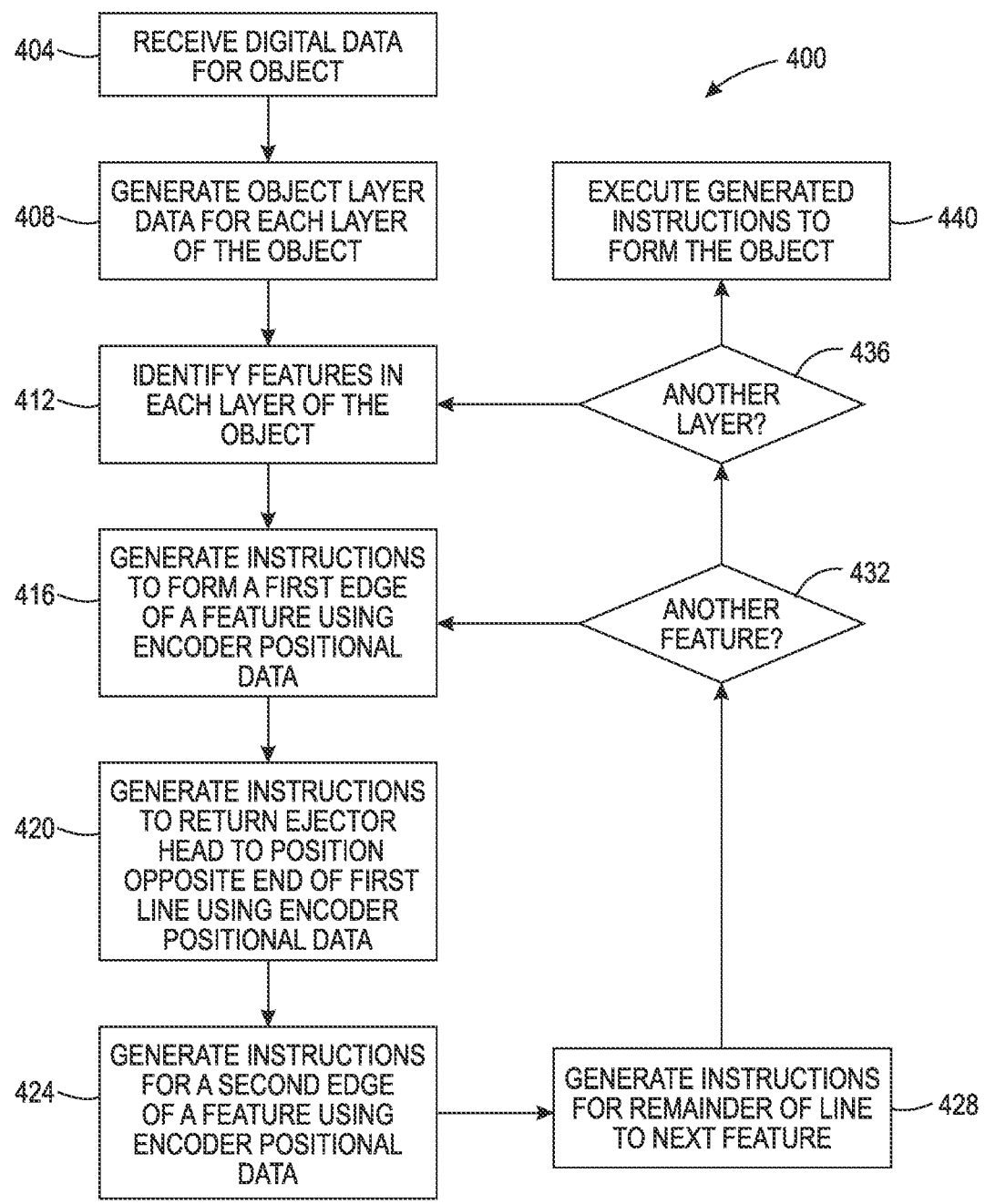
FIG. 4 is a flow diagram of a process implemented by a slicer program in the printer of FIG. 1 that forms features more precisely than previously known 3D object printers by moving the ejector and the platform relative to one another to predetermined locations identified by encoder values to form the edges of the feature.

FIG. 4 is a flow diagram of a process that operates a material drop ejecting 3D object printer, such as printer 100, to form features more precisely than previously known printers. The process 400 begins with the slicer receiving the digital data model for the object to be produced (block 404). The slicer then generates object layer data for forming the layers of the object (block 408). The slicer then identifies features in object layer data for each layer (block 412). Rather than generating machine ready instructions that decelerate the relative movement of the ejector head and the platform as the ejector approaches a turn in the perimeter of a feature as previously done, the slicer generates machine ready instructions that move the ejector head and the platform relative to one another to form a first edge of the feature having its end identified by an encoder value for a position of the last drop ejected to form the first edge of the feature (block 416). Instructions are generated that move the ejector and the platform relative to one another to return the ejector to the identified position of the last drop in the first edge using encoder positional data (block 420). Instructions are also generated for moving the ejector and the platform relative to one another while operating the ejector to eject drops to form a second edge of the feature using encoder positional data (block 424). In one embodiment, the position of the first drop of the second edge is ejected within a merge distance of the last drop in the first edge. As used in this document, the term "merge distance" means a distance between the centers of adjacent drops on a surface that enable the drops to form a continuous line. In one embodiment, the merge distance is one-half of the diameter of the last drop ejected in the first edge of the feature. Instructions for forming the remaining portion of the perimeter are generated in a known manner until another feature is identified so the process can be repeated (block 428). This process is repeated for each feature in a layer (block 432) and for each layer (block 436). When all of object layer data has been processed, the machine ready instructions are executed by the controller to operate the printer and form the object on the platform 112 (block 440).

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A material drop ejecting three-dimensional (3D) object printer comprising:
   an ejector having at least one nozzle that is configured to eject drops of a material;
   a platform positioned opposite the ejector;
   at least one actuator operatively connected to at least one of the platform and the at least one ejector, the at least one actuator being configured to move the at least one of the platform and the at least one ejector relative to one another; and
   a controller operatively connected to the ejector and the at least one actuator, the controller being configured to:
      identify a feature to be formed in an object layer of an object to be formed on a platform using an object data model of the object to be formed;
      operate the ejector to eject drops of a material while operating the at least one actuator to move the ejector and the platform on which the object is being formed move relative to one another to form a first edge of the feature;
      operate the at least one actuator to move the ejector and the platform relative to one another so the ejector moves away from an end of the first edge;
      operate the at least one actuator to move the ejector and the platform relative to one another to return the ejector to the end of the first edge; and
      operate the ejector to eject drops of the material while operating the at least one actuator to move the ejector and the platform relative to one another to form a second edge of the feature, the first edge and the second edge forming at least a portion of a perimeter of the feature.

2. The printer of claim 1, the controller being further configured to:
  identify a predetermined location for a last drop of material to be ejected into the first edge of the feature using positional data from an encoder for the relative movement between the ejector and the platform; and
  operate the at least one actuator using the positional data from the encoder to return the ejector to the predetermined location for the last drop of the first edge.

3. The printer of claim 2, the controller being further configured to:
  identify a predetermined location for a first drop of material to be ejected into the second edge of the feature using positional data from the encoder for the relative movement between the ejector and the platform; and
  operate the ejector using the positional data from the encoder to eject the first drop for the second edge at the identified predetermined location for the first drop of the second edge.

4. The printer of claim 3, the controller being further configured to:
  operate the ejector using the positional data from the encoder to eject the first drop for the second edge so the predetermined location for the last drop of the first edge and the predetermined location for the first drop of the second edge are within a merge distance of one another.

5. The printer of claim 4, wherein the merge distance is approximately one-half of a diameter of a drop ejected by the ejector.

6. The printer of claim 3, the controller being further configured to:
  operate the at least one actuator using the positional data from the encoder to move the ejector and the platform relative to one another along a circular path to return the ejector to the predetermined location of the last drop in the first edge of the feature.

7. The printer of claim 3, the controller being further configured to:
  operate the at least one actuator using the positional data from the encoder to move the ejector and the platform relative to one another along a non-circular path to return the ejector to the predetermined location of the last drop in the first edge of the feature.

8. The printer of claim 3, the controller being further configured to:
  operate the at least one actuator using the positional data from the encoder to move the ejector and the platform relative to one another to form the first edge of the feature and the second edge of the feature at right angles to one another.

9. The printer of claim 3, the controller being further configured to:
  operate the at least one actuator using the positional data from the encoder to move the ejector and the platform relative to one another to form the first edge of the feature and the second edge of the feature at acute angles to one another moving.

10. The printer of claim 3, the controller being further configured to:
  operate the at least one actuator using the positional data from the encoder to move the ejector and the platform relative to one another to form the first edge of the feature and the second edge of the feature at obtuse angles to one another.

11. The printer of claim 1, the controller being further configured to:
  identify the feature using an object layer data model before moving the ejector and the platform relative to one another and before operating the ejector to form the object.

12. The printer of claim 1, the controller being further configured to:
  operate the at least one actuator to move the ejector and the platform at a constant velocity during the relative movement between the ejector and the platform.

13. The printer of claim 1, the controller being further configured to:
  generate machine ready instructions for operating components of the 3D object printer to move the ejector and the platform relative to one another and to operate the ejector to form the first edge and the second edge of the feature; and
  execute the generated machine ready instruction to operate the components of the 3D object printer to move the ejector and the platform relative to one another and to operate the ejector to form the first edge and the second edge of the feature.

* * * * *